United States Patent
Lam et al.

(10) Patent No.: US 6,862,099 B2
(45) Date of Patent: Mar. 1, 2005

(54) TUBULAR OVALITY TESTING

(75) Inventors: Clive Chemo Lam, Tomball, TX (US); Manfred Hermann Worms, Nienhagen (DE); Helmut Wolfgang Knapwost, Nienhagen (DE); Bernd Helmut Dobberstein, Burgdorf (DE)

(73) Assignee: Varco I/P, Houston, TX (US)

( * ) Notice: Subject to any disclaimer, the term of this patent is extended or adjusted under 35 U.S.C. 154(b) by 385 days.

(21) Appl. No.: 10/117,312

(22) Filed: Apr. 5, 2002

(65) Prior Publication Data

US 2003/0189713 A1 Oct. 9, 2003

(51) Int. Cl.$^7$ ............................................. G01B 11/08
(52) U.S. Cl. ................................. 356/635; 250/559.24
(58) Field of Search .............................. 356/635, 638; 250/559.24; 33/556–558

(56) References Cited

U.S. PATENT DOCUMENTS

| | | | |
|---|---|---|---|
| 3,894,425 A | 7/1975 | Winters et al. ............ 73/67.8 S |
| 4,240,206 A | * 12/1980 | Baresh et al. ................. 33/558 |
| 4,248,092 A | 2/1981 | Vasile et al. .................. 73/643 |
| 4,361,044 A | 11/1982 | Kupperman et al. .......... 73/623 |
| 4,700,572 A | 10/1987 | Senba et al. .................. 73/622 |
| 5,007,291 A | 4/1991 | Walters et al. ................ 73/640 |
| 5,028,798 A | * 7/1991 | Biswas et al. ........... 250/559.21 |
| 5,030,911 A | 7/1991 | Lam .......................... 324/226 |
| 5,228,343 A | 7/1993 | Schoenen et al. ............. 73/644 |
| 5,313,837 A | 5/1994 | Haynes ........................ 73/627 |
| 5,392,652 A | 2/1995 | Levesque et al. ............. 73/629 |
| 5,473,943 A | 12/1995 | Schoenen et al. ............. 73/644 |
| 5,534,775 A | 7/1996 | Lam et al. .................. 324/216 |
| 5,600,069 A | 2/1997 | Girndt et al. ................. 73/622 |
| 5,656,786 A | 8/1997 | Curtis, Jr. et al. .......... 73/865.8 |
| 5,666,203 A | * 9/1997 | Hansen ...................... 356/635 |
| 5,867,275 A | * 2/1999 | Curtis et al. ................ 356/635 |
| 5,914,596 A | 6/1999 | Weinbaum .................. 324/228 |
| 6,249,119 B1 | 6/2001 | Curtis, Jr. et al. .......... 324/242 |
| 6,398,731 B1 | 6/2002 | Mumm et al. .............. 600/437 |
| 6,415,867 B1 | 7/2002 | Deul et al. .................. 166/367 |
| 6,474,165 B1 | 11/2002 | Harper et al. ................ 73/623 |
| 6,543,272 B1 | 4/2003 | Vitek ......................... 73/1.83 |

FOREIGN PATENT DOCUMENTS

| | | |
|---|---|---|
| GB | 2124379 A | 7/1983 |
| GB | 2280507 A | 7/1993 |

* cited by examiner

Primary Examiner—Richard A. Rosenberger
(74) Attorney, Agent, or Firm—Guy McClung

(57) ABSTRACT

A system for measuring diameter (inner and/or outer) of a tubular, the system in at least certain aspects including at least one linear distance measuring device with respect to which a tubular to be measured is movable, the at least one linear distance measuring device including a detector for detecting a surface of the tubular, the detector movably mounted to mount apparatus, the detector movable longitudinally along the surface of the tubular and movable axially in response to variation in diameter of the tubular, a rotatable head rotatable with respect to the tubular either outside of it or within it, the mount apparatus secured to the rotatable head, at least one signal production apparatus secured to the mount apparatus or head, and in communication with the linear distance measuring device, the at least one signal production apparatus for producing a signal indicative of distance between said detector and a known point, and transmitting apparatus for transmitting said signals to processing equipment for determining diameter of the tubular; and in certain aspects the linear distance measuring device is a laser device, electronic measurement device, acoustic measurement device, infrared measurement device, or linear variable differential transformer device.

40 Claims, 4 Drawing Sheets

TUBULAR OVALITY TESTING

BACKGROUND OF THE INVENTION

1. Field of the Invention

The present invention is directed to apparatus and methods for measuring the diameter and ovality of tubulars e.g., but not limited to, pipe, tubing, risers, and casing. In certain particular aspects, this invention relates to techniques and systems for detecting irregularities in either the diameter (inner and/or outer) or the ovality of oilfield tubulars by non-destructive testing equipment.

2. Description of Related Art

The prior art reveals a variety of non-destructive testing equipment to measure ovality of tubulars and to detect material defects in them. Ultrasonic and electromagnetic testing techniques and equipment can detect material defects at rates in the range of from 40 to 400 thirty-foot joints of pipe per hour. Relatively high speed testing equipment reduces the cost of non-destructive testing and reduces the lead time between a pipe order to an inspection yard and the delivery of inspected oilfield tubulars to a well site. Prior art equipment has been used for detecting irregularities in the outside diameter and ovality of oilfield tubulars; but many oilfield tubulars are still manually checked with O.D. calipers. While manual checking operations may be satisfactory when only random checks are to be made on a lot of oilfield tubulars, this technique can become too expensive and time consuming when numerous axial locations along the length of a tubular are to be checked for outer diameter and ovality conformance. In some cases manual checking of oilfield tubular diameter and ovality is not practical.

In one prior art testing system, a pair of light beams are each directed traverse to the axis of the tubular. A pair of relatively wide light beams strike radially opposing sides of the tubular, so that the tubular material blocks light to alter the width of each beam. The spacing between the reduced width beams is accordingly a measure of the diameter of the oilfield tubular. Optical systems can test oilfield tubular diameters at a rate commensurate with the speed of non-destructive equipment systems used for testing oilfield tubulars.

With certain prior art systems some problems remain; e.g. with some existing optical testing systems a relatively long time period is required to process data from detectors which sense the presence of light and generate raw data indicative of the spacing between the reduced width light beams. In may cases orders to inspection yards are typically performed on a first-in/first-out basis; successive orders are rarely for the same pipe size, and a single inspection order may require the testing of different oilfield tubular sizes. One or more recalibrations of the testing equipment may be needed. In some cases a test standard corresponding to a specific size tubular to be tested is positioned within testing equipment and the equipment is then calibrated or "zeroed" to that test standard. Optical testing equipment can measure positive or negative variations from the test standard when performing an O.D. test on a specific size oilfield tubular. A printout to an inspection operator can indicate the positive or negative variation of the tubular diameter compared to the test standard. Such a method has several problems. A relatively long time period is required to recalibrate the equipment each time a different size oilfield tubular is to be tested. Often it is preferable to test oilfield tubular diameter and ovality at the same time each tubular is being checked for material defects with non-destructive testing equipment, and the time required to recalibrate the optical equipment for checking a tubular diameter slows down the overall inspection process. Many inspection yards maintain a complete set of different oilfield tubular diameter test standards to be used to calibrate the optical inspection equipment, and these tubular diameter test standards must be carefully maintained, since any variation of the test standard will lead to incorrect diameter variation measurements.

In one prior art system and method oilfield tubular diameter and ovality are tested at a relatively high feed through tubular speed, and the test data is output to an inspection operator in real time, i.e., data for a specific tubular is available to the inspection operator while that tubular is being tested. This prior art diameter and ovality testing equipment can utilize optical techniques which recognize that the spacing between the "passing portion" of two light beams each striking the tubular in a direction traverse to the tubular axis is directly related to the diameter of the tubular at that test location; and light sensors thus detect the width of the light beam transmitted past the tubular. Signals from the sensors are input to a computer and then output to a screen and/or conventional data storage device to provide real-time diameter measurements. A tubular may be rotated as it is moved axially through the test equipment and the ovality test is obtained as a function of successive diameter measurements. This prior art equipment may be compatible with non-destructive testing equipment, so that a lot of tubulars may be tested for material defects and for diameter and ovality conformance at the same time. Such a system and method is described in U.S. Pat. No. 5,867,275 incorporated herein in its entirety for all purposes. In one aspect this prior art system has apparatus for testing the diameter of tubulars having various nominal diameters, including a machine frame for successively receiving axially moveable tubulars; first and second radially opposing carriages each moveable relatively to the machine frame such that an axially moveable tubular passes between the radially opposing carriages; first and second light generating sources mounted on their respective first and second carriages for transmitting respective first and second wide light beams directed to intersect radially opposing sides of the tubular spaced between the carriages, such that the width of the first and second light beams is reduced by engagement with the tubular and first and second reduced width light beams pass by the tubular; first and second light sensors each mounted on the carriages for detecting the respective first and second reduced width light beams while the tubular moves axially past the first and second light beams and generating test signals in response thereto; first and second optical shutters mounted on the carriages and each moveable with respect to the respective light beam from an active standardization check position to an inactive tubular-test position, each optical shutter having an opening therein for transmitting a pre-selected reduced width light beam past the shutter; and a computer for receiving the test signals from the first and second light sensors and generating a tubular diameter test measurement in response thereto.

In certain prior art systems pipe is inspected as it exits from pipe manufacturing apparatus. As it exits, it is not being rotated. If the manufacturing method is altered to rotate the pipe, pipe production rate is decreased.

There is a need, recognized by the present inventors, for an efficient and effective tubular inspection system which accurately measures tubular diameter. There is a need, recognized by the present inventors, for an efficient and cost-effective tubular inspection system that can accurately take into account the off-centering of a tubular during inspection. There is a need, recognized by the present inventors, for such systems that efficiently and accurately transmit and process signals related to tubular diameter measurement.

SUMMARY OF THE PRESENT INVENTION

The present invention, in at least certain aspects, provides systems and methods for measuring the ovality of tubulars. In certain aspects such system and methods include one, two, three, four or more detecting shoes which contact a surface (inner or outer) of a tubular. The detecting shoe(s) are movably mounted or suspended adjacent the tubular so that they can contact, remain in contact with, and float or "ride" on the tubular's outer surface as the tubular is moved past the shoe(s); e.g. as the tubular is moved through a head on which the shoe(s) are mounted; or the detecting shoe(s) are on a carriage or other mount device, support, or apparatus within the tubular so that they contact, float on, ride on, and remain in contact with the tubular's inner surface as the carriage, mount etc. moves through the tubular.

A sensor is positioned adjacent the shoe(s) and is fixed independently of the shoe(s). The shoe(s) can move axially in response to contact with the tubular's outer surface and the sensor remains fixed with respect to a frame, support, housing or structure moving on or through which the tubular is moving or which moves through the tubular. Thus, variations in tubular diameter results in a varying axial distance between the detecting shoe(s) and the sensor. By measuring this axial distance, the diameter (inner and/or outer) of the tubular is determined; and by indicating variance in this distance, variation in the ovality of the tubular is indicated. In certain aspects the distance from a part of or of a member on the shoe to the sensor is measured, known, and recorded. This distance is continuously measured as the tubular, and thus the shoe(s), move past the sensor, indicating either an unvarying known tubular diameter (and hence a substantially circular tubular cross-section) or diameter variance (and hence a non-circular tubular cross-section at that location).

In one particular aspect two opposed detecting shoes are used each with its own sensor. In one aspect, both an interior and exterior set of shoes are used to simultaneously measure both inner and outer diameter.

It is within the scope of this invention to use as the sensor (or sensors) a laser measuring apparatus which directs a laser beam to a beam reflector or beam reflecting surface on a detecting shoe. Since the shoe can move axially in response to a variation in the outer diameter of the tubular being tested, the distance between the beam reflector or surface and the laser apparatus can vary. Indicating this distance variation indicates a variation in the tubular's ovality; and measuring this variance indicates its extent.

In other aspects the sensor is any suitable known linear distance measuring device or apparatus, including, but not limited to, an acoustic distance measuring device or apparatus; an electrical inductive distance measuring device or apparatus; or an electrical capacitative distance measuring device or apparatus (e.g., but not limited to, a linear variable differential transformer or LVDT).

In certain embodiments the present invention provides a system and method for measuring the ovality of a tubular using a rotating head with laser apparatus or apparatuses which rotate around a tubular to be measured, tracing a spiral path therearound and/or therein as the tubular is moved through the head and/or as the head moves through the tubular.

In certain embodiments, the present invention provides a system for tubular ovality measurement which has an arm on which is mounted a shoe or shoes, each with a surface that contacts a tubular member. A sensor or sensors sense the sensor/shoe distance. A variation in this distance indicates variation in the tubular's ovality.

The present invention, in certain embodiments, provides a system which processes a sensor generated signal to eliminate the effects of tubular off-centering with respect to the testing equipment. When a tubular to be tested is properly centered with respect to a testing system according to the present invention, and an even number of shoes and sensors are used, the tubular's diameter is a function of the thickness of the shoes and the distances between shoes and corresponding sensor equipment. When a tubular is off-center with respect to the testing equipment, a decrease in the shoe-sensor distance for a first shoe/sensor apparatus is offset by an increase in the shoe/sensor distance for a second shoe/sensor apparatus opposite the first. In the processing of data from such a system, the decreased distance mathematically cancels out the increased distance, the effect of off-centering of a tubular is nullified, and thus a correct diameter measurement (inner and/or outer) is obtained despite such tubular off-centering.

The present invention, in certain embodiments, provides a tubular ovality measurement system with a head or other support structure which rotates around and/or within a tubular to be tested while the tubular is moved through the head and/or while the head is moved through the tubular. One or more laser apparatuses are mounted on the head which direct a laser beam to a detector or shoe that contacts the tubular's surface. Measurement of the laser/shoe distance provides an indication of ovality and of ovality variation.

In certain known prior art tubular testing systems, an ultrasonic sensor that senses an ultrasonic beam ovality-indicating measurement generates with processing circuitry a signal indicative of that measurement and transmits the signal through a wire to a ring system with conducting ring(s) on the head and apparatus adjacent the rotating head or apparatus support. A contact apparatus in contact with the ring(s) receives signals from the ring(s) and transmits them on to a processor apparatus (e.g., but not limited to, suitable electronic processors, a computer or computers). According to the present invention, systems are provided that use a laser beam apparatus rather than an ultrasonic apparatus. In certain aspects the computer or computers are mounted on the head or support structure. In other embodiments according to the present invention the ring system is deleted (or remains but is not used) and a wireless transmitter is mounted on the head for transmitting the signals from the processor(s) on the rotating head to processor apparatus apart from the head (the processor apparatus apart from the head may be immediately adjacent the test equipment and/or remote therefrom and/or able to be communicated with via the Internet or other suitable wired or wireless communication systems, cable, or phone line systems). In one particular aspect a wireless communication device, e.g. but not limited to an Ethernet communication device, is mounted on the rotating head. A processor (or processors) on the head communicates with the wireless communication device supplying digitized signals corresponding to tubular diameter measurements. The wireless communication device transmits these signals to a processor (or processors) apart from the test equipment. The processor (or processors) that receive the signals from the wireless communication device process the signals; provide real-time displays (e.g. on screen and/or paper chart) of data and/or tubular images (e.g. cross-sectional views indicating diameter measurement and/or circularity/ovality); provide graphical representations of tubular cross-section shape and/or diameter measurement; and/or provide apparatus and methods for recording both raw and processed data and results. In other aspects a microwave or an infrared wireless communication system may be used.

It is, therefore, an object of at least certain preferred embodiments of the present invention to provide:

New, useful, unique, efficient, non-obvious non-destructive systems and methods for measuring the diameter (inner and/or outer) of a tubular;

Such systems and methods which take into account and nullify the effects of tubular off-centering with respect to test equipment;

Such systems and methods which have a rotating head with processing apparatus thereon for processing raw diameter measurement data from diameter sensor apparatus also on the head;

Such systems and methods with wireless communication apparatus on the rotating head for transmitting data from the on-head processing apparatus to off-head processing apparatus; and Such systems and methods which provide an indication of and/or a display and/or print out of tubular ovality (if present) and/or of tubular cross-sectional shape.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

DESCRIPTION OF EMBODIMENTS
PREFERRED AT THE TIME OF FILING FOR
THIS PATENT

Figure 1A:
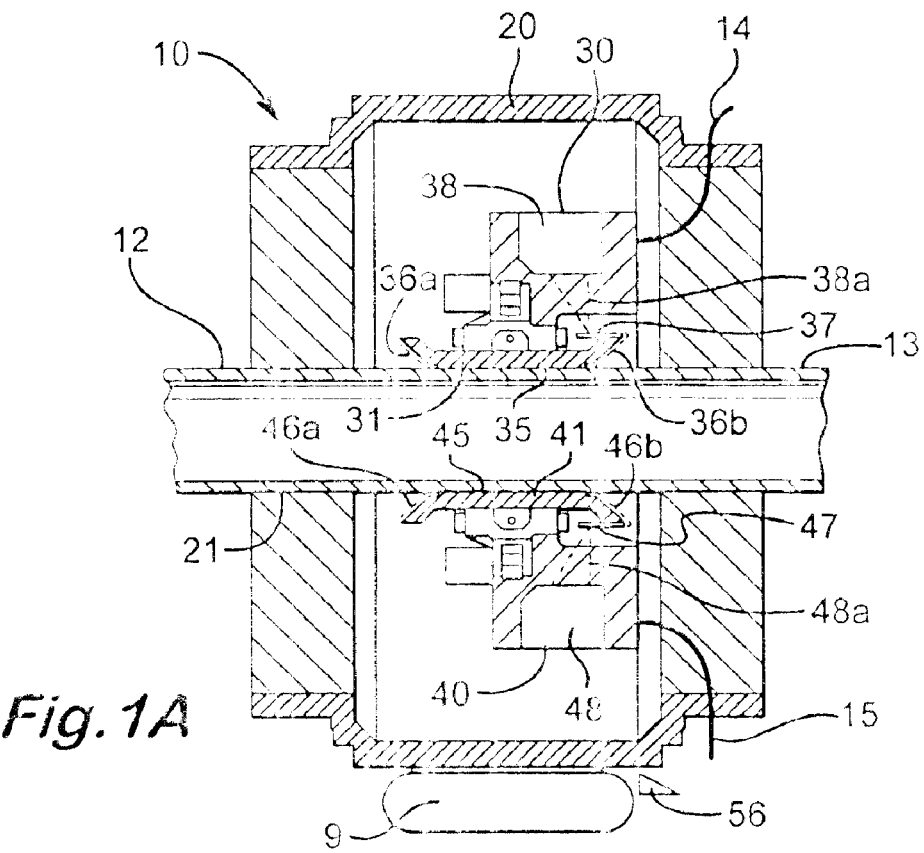
FIG. 1A is a side cross-sectional view of a tubular inspection system according to the present invention.
Figure 1B:
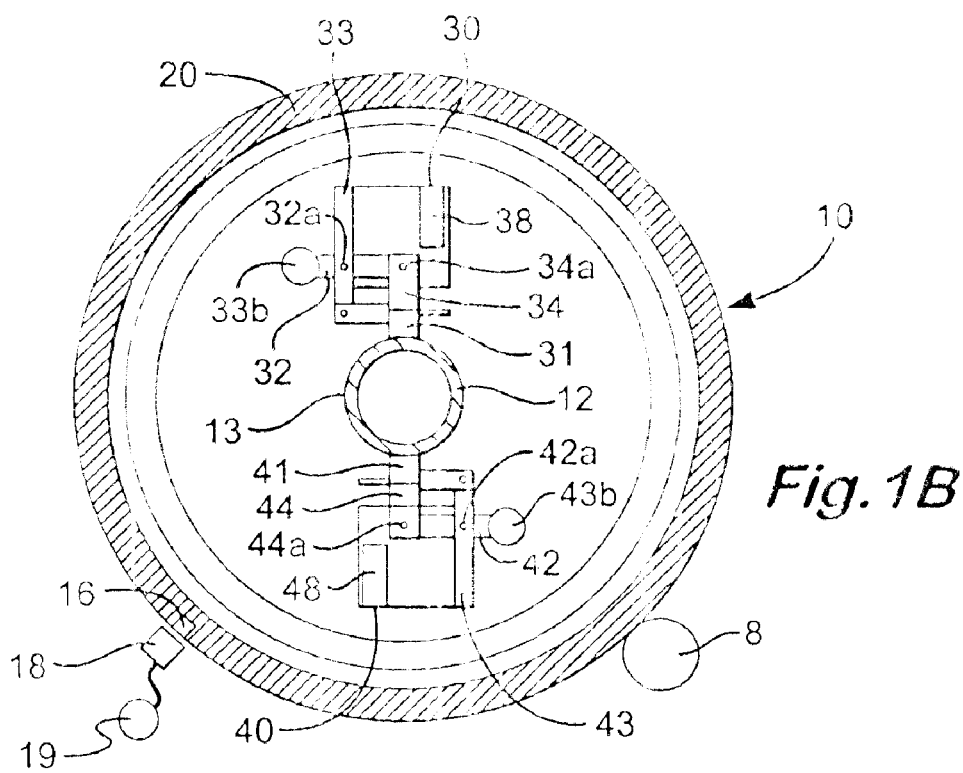
FIG. 1B is a cross-section view of the system of FIG. 1A.

FIGS. 1A and 1B show schematically a system 10 according to the present invention which has a rotatable head 20 mounted on suitable rotating and movement apparatus 9 (shown schematically; e.g., any known suitable head movement and rotation apparatuses may be used) for rotating the rotatable head 20 around a pipe 12 (or any tubular to be inspected) which is movable through a central opening 21 of the rotatable head 20.

A pair of sensor devices 30 and 40 are connected to the head 20. The sensor devices 30, 40 each has a detecting shoe 31, 41, respectively, each has an arm 32, 42 which is pivotally mounted at pivot points 32a, 42a, respectively to supports 33, 43. The supports 33, 43 are connected to the head 20. Optionally, a counterweight (or counterweights) 33b, 43b, respectively, may be used with the detecting shoes. Shoe mounts 34, 44 are pivotally mounted to arms 32, 42, respectively, at pivot points 34a, 44a, respectively.

The detecting shoes 31, 41 are positioned and configured so that their lower surfaces 35, 45, respectively contact the outer surface 13 of the pipe 12 and, when the head is rotating, trace a spiral path around the pipe. The detecting shoes may have any suitable length. Upturned ends 36a, 36b, 46a, 46b of the shoes are optional. Each shoe has a beam reflector 37, 47 (e.g., but not limited to a beam reflector, beam reflective surface, or mirror) connected thereto. As a shoe contacts the pipe's outer surface 13, its corresponding reflector 37, 47 will travel along the pipe 12's outer surface 13 and will move axially if this surface varies. A linear motion encoder 56 (see also FIG. 1D) indicates longitudinal location of the pipe and is interconnected with a computer and/or other data processing/recording equipment (as are the sensor devices 30, 40).

Each sensor device 30, 40 has a laser apparatus 38, 48, respectively, which emits a laser beam 38a, 48a, respectively, and directs the laser beam to the corresponding reflector. A reflected laser beam is received by each sensor device which produces a signal indicative of the distance from the sensor device (fixed to the head 20 via the connection of the supports 33, 43) to the corresponding reflector—a distance which depends on and is indicative of the outer diameter ("O.D.") of the pipe 12 at the point of contact between the pipe 12 and one of the shoes.

Via cables 14, 15 the O.D. indicating signals are sent from the sensor devices 30, 40, respectively in analog form (e.g. representative of a voltage or current loop) to signal processing equipment and/or data display apparatus.

A head marker 16 rotates past a marker sensor 18 each time the head 20 completes a revolution around the pipe 12. The marker sensor 18 is connected to processing equipment 19 (to which the cables 14, 15 may also be connected) which processes data from the sensors 30, 40 (e.g. converts analog signals to digital signals) and correlates the data with a particular revolution of the head 20, and, therefore, with a particular longitudinal location on the pipe 12. Any suitable known power source or power apparatus 8 (shown schematically in FIG. 1B) may be used with the head 20 to rotate it (and any other head, mount or support herein for sensors and/or detectors may have such a power source or apparatus). Also it is within the scope of the present invention to employ a wireless power device adjacent to or on the head to provide power to rotate the head.

Figure 1C:
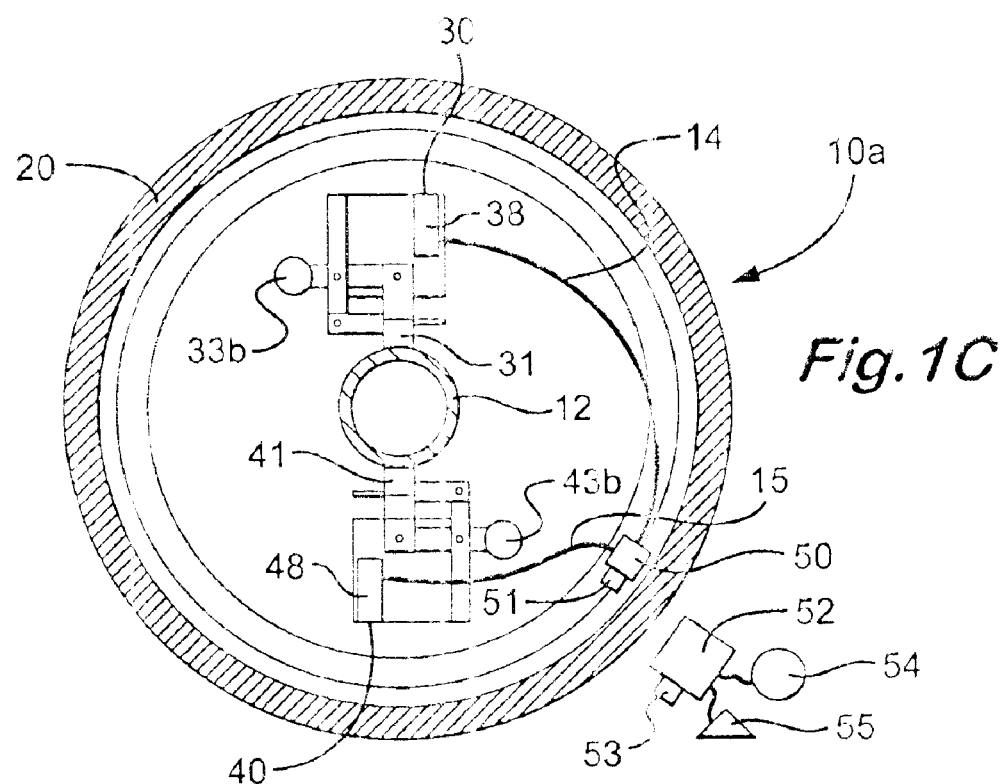
FIGS. 1C and 1D are cross-section views of systems according to the present invention.

FIG. 1C shows a system 10a, like the system 10, FIGS. 1A and 1B, and like numerals indicate like parts. A computer 50 is mounted on the rotating head 20 for processing analog signals from 30 the sensors 30, 40 via cables 14, 15. An Ethernet communication device 51 (e.g. an Ethernet card) wirelessly transmits digitized signals received from the computer 50 (corresponding to the analog measurement signals from the sensors 30, 40) to a processing computer 52 which is apart from the rotating head 20. The processing computer 52 has an Ethernet communication device 53 (e.g. an Ethernet card) for wirelessly communicating with (transmitting, receiving) the Ethernet device 51 on the rotating head 20. The computer 52 may display processed data and/or produced tubular images (e.g. cross-sections) on a screen 54 and/or may interface with a printer or strip chart device 55 to produce a hard paper copy showing data in tabular form, in a matrix, or graphically.

Figure 1D:
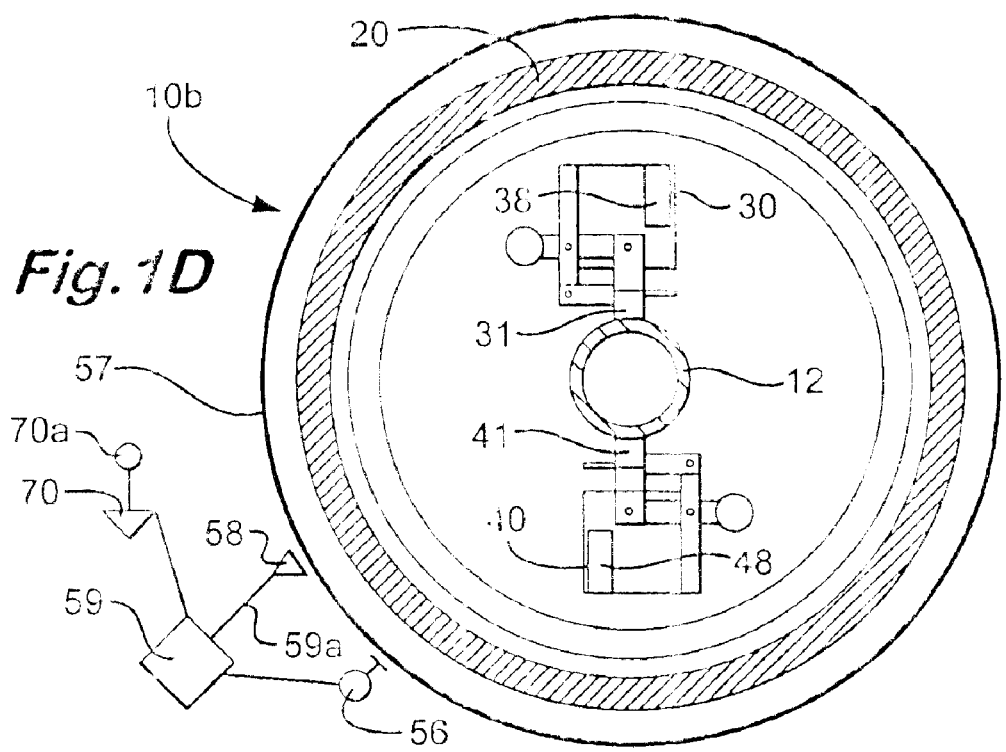

FIG. 1D shows a system 10b, like the system 10, FIGS. 1A and 1B, and like numerals indicate like parts. The system 10b utilizes the known ring-contact system for transmitting data from the sensors 30, 40 away from the rotating head 20 to data processing equipment 59. A ring system 57, like any suitable known ring-contact data transmission system in the prior art(e.g. with silver or copper conducting rings), is mounted adjacent the rotating head 20. Receiving conductor contacts 58 (e.g. made of a good conductor, e.g. graphite) (two per conducting ring of the system 57) contact conducting rings and receive the data via which is transmitted via cable(s) 59a to processing equipment 59. The ring system 57 may include one or more strips of conductor around the head (e.g., but not limited to, strips of silver or copper around the head's circumference). Longitudinal location on the pipe is sensed by a linear motion encoder 56 (se FIG. 1D; e.g. any known encoder; which may be used with any system according to the present invention) which feeds a signal indicative of longitudinal position to the data processing equipment 59. Alternatively, data is transmitted from the head by typical data transmission apparatus to a computer or other processor apart from the head. Alternatively according to the present invention, the encoder has a wireless transmission device to wirelessly transmit data to the equipment 59 (or to any suitable processor, computer, electronic device, etc.).

Figure 2A:
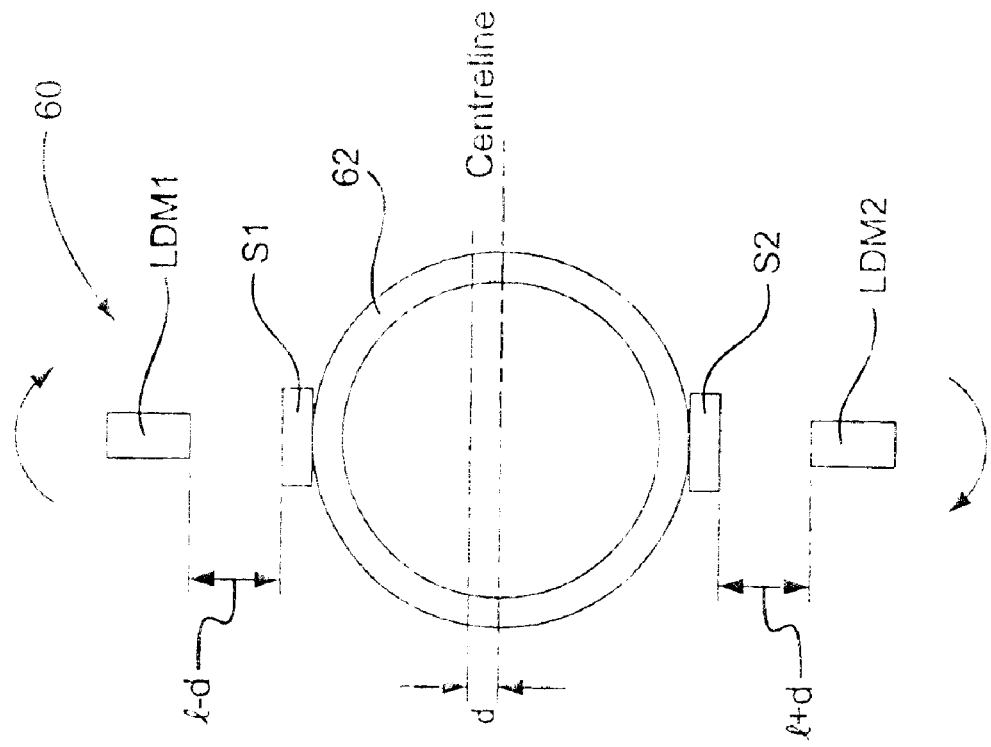
FIGS. 2A, 2B and 3 are cross-section views of tubular inspection systems according to the present invention.
Figure 2B:
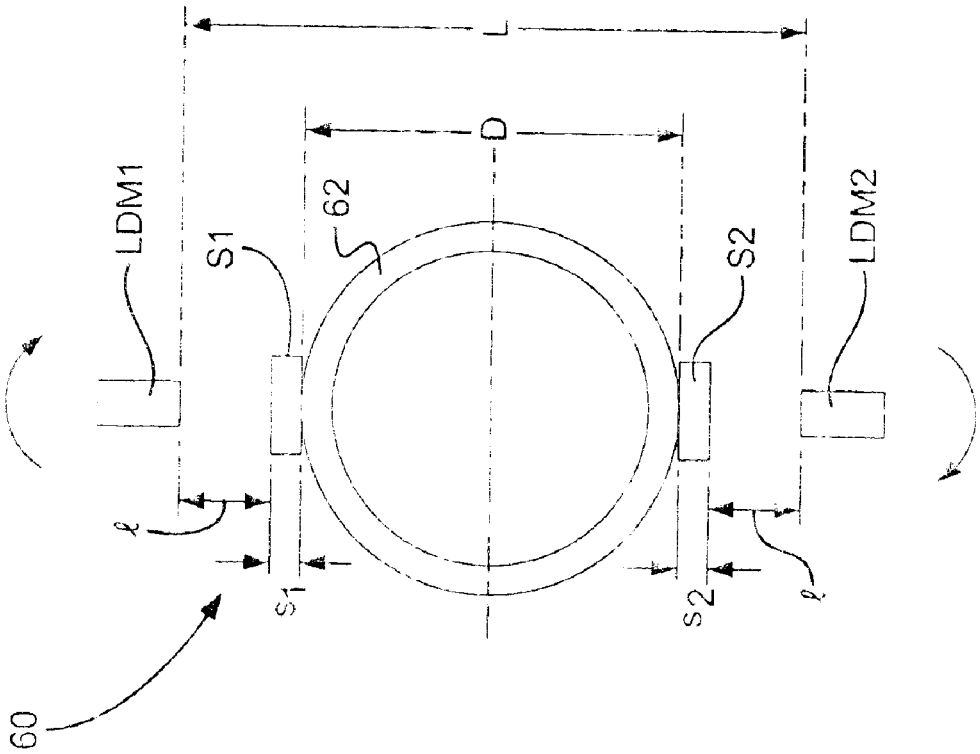

FIG. 2A shows a system 60 according to the present invention for measuring the outer diameter of a tubular member such as a pipe 62 which has an outer diameter D as shown in FIG. 2A. On a rotating head (not shown, like the head 20, FIG. 1A) are mounted two linear distance measuring devices LDM1 and LDM2, each initially spaced-apart a distance l from the top of corresponding detector shoes S1, S2. The shoes S1, S2 are like any shoe disclosed above and/or like the shoes 31, 41, FIG. 1A with similar mounting to the head. "L" as indicated in FIG. 2A is the distance (as viewed in FIG. 2A) from the bottom of the device LDM1 to the top of the device LDM2—a distance that does not vary during the operation of the system 60. The thicknesses $s_1$, $s_2$, of the shoes S1, S2, respectively also do not vary during the operation of the system 60. However, if a pipe or tubular's position within the system 60 is off-center, then the distances l between linear measurement devices LDM1, LDM2 and their respective shoes S1, S2 can vary, as shown in FIG. 2B. If a shoe wears, then new shoe thicknesses $s_1$, $s_2$ are measured and used and the system recelebrated accordingly. Periodically the shoes are replaced.

As shown in FIG. 2B the pipe 62 is off-center by a distance d; thus the distance from the device LDM1 to the shoe S1 is l−d and the distance from the device LDM2 is l+d. For the pipe 62 at the position shown in FIG. 2A, the diameter D is given by this formula:

$$D = L - l - l - s_1 - s_2$$

When the pipe 62 is off-centered, e.g. as shown in FIG. 2B, the diameter is given by this formula:

$$D = L - (l - d) - (l + d) - s_1 - s_2$$

which yields $$D = L - l - l - s_1 - s_2$$

i.e., the effect of the distance d of off-centering is nullified and a correct measurement of diameter is obtained. Similar calculations apply to off-centering of a system according to the present invention within a tubular. Processing equipment, electronic calculators, and/or computer(s) of the systems according to the present invention are programmed to effect these calculations using these formulas.

The devices LDM1 and LDM2 may be any known linear measurement devices, including, but not limited to, laser devices as in the system 10, FIG. 1A; acoustic or infrared measurement devices; linear variable differential transformer devices; and electronic measurement devices. In one particular embodiment, the LDM1 and LDM2 devices are laser devices as in FIG. 1A. A sensor 18 (FIG. 1A) senses a signal from a non-rotating reflector to mark each revolution. When a computer is on the head and data is wirelessly transmitted, the sensor 18 is on the head and a marker is on a stationary member adjacent the head. An encoder apparatus, e.g., like the encoder 56 described above, may be used with the system 60 (and with any system herein according to the present invention) to provide data related to longitudinal position on the pipe at which a diameter measurement is made.

A computer 50 on the head collects the distance measurements and marker signals, and computes the ovality, e.g. using a Fourier transform of the diameter readings with respect to the circumference. The computer transmits computed results to a stationary computer at each revolution via the wireless Ethernet (or via a ring system as in FIG. 1D). The stationary computer receives the diameter data and the computed results from the rotating computer, and receives a signal (from the linear motion encoder) indicating the length of pipe travel, e.g, a given unit length, such as one inch. The computer displays inspection results and/or generates a two-dimensional data matrix, one axis of which is the length of the pipe, another axis is the circumference, the diameter reading at a given location of the pipe is also presented in this matrix. This data matrix is storable in a disk file for each pipe and can be transmitted to a customer via electronic means, e.g., Email, Ethernet, and/or it can be stored in a floppy disc or CD for distribution. Integrating the ovality data results with wall thickness data obtained with a known system for obtaining such data can be used to calculate and predict pipe collapse.

In certain aspects of methods according to the present invention, a tubular's diameter is a function of the tubular's circumference and if a tubular diameter measured at a certain location on the tubular corresponds to the given diameter, then the tubular, at that location, is round, i.e., circular. If the measured diameter (inner and/or outer) at a particular location is different from the given diameter, the tubular is oval (i.e. not round or circular) at that point.

Any computer, processor, or data processing equipment herein may include data storage apparatus (e.g. apparatus 70, FIG. 1D) for storing data and/or calculated results and/or images. Any such computer and/or such data storage apparatus may, according to the present invention, include screen, printer, and/or chart apparatus (e.g. apparatus 70a, FIG. 1D) for displaying and presenting data, images, and/or results.

Figure 3:
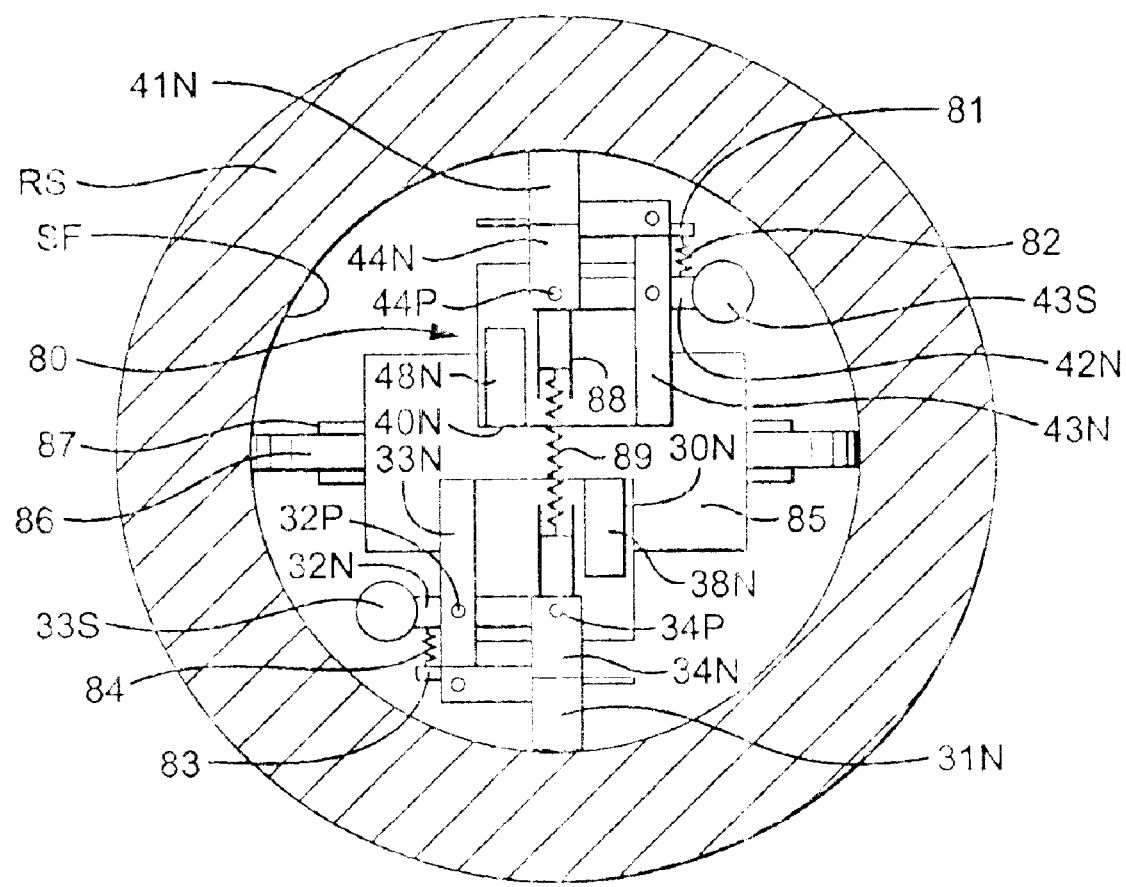

FIG. 3 shows a system 80 according to the present invention which is like the previously described systems of FIGS. 1A–1D and like numerals indicate like parts (e.g. sensor 30N corresponds to sensor 30; pivot point 34P corresponds to pivot point 34a; and counterweight 43S corresponds to counterweight 43b). The counterweights 33S, 43S are optional.

Detectors 31N, 41N contact the inner surface SF of a riser RS (of course it is within the scope of this invention to use such a system according to the present invention within any tubular, including, but not limited to, pipe, casing, and tubing). Springs 82, 84 biased between bars 81, 83, respectively and arms 32N, 42N respectively urge the arms 32N, 42N inwardly, thereby urging the detectors 31N, 41N outwardly. It is within the scope of this invention to employ one or more springs or other yieldable urging members or mechanisms positioned between the sensors and urging them outwardly, e.g. but not limited to the optional hollow bar 88, spring 89 arrangement shown in FIG. 3 in which the spring 89 urges both detectors 31N, 41N outwardly. It is within the scope of this invention to use any known device, structure, mechanism, or apparatus to yieldably urge the detectors 31N, 41N outwardly to float or ride on the inner surface SF of the riser RS, including, but not limited to, leaf springs, coiled springs, disc springs, solid flexible cushions, gas-filled or liquid-filled bladders or bellows and cylinder/piston mechanisms. It is also within the scope of this invention to use one, two, three, four, five, six or more detectors.

The sensors 30N, 40N are mounted on a carriage 85 with rotatable wheels 86 rotatably mounted on axle apparatuses 87. Any known carriage, head, or mount structure used for moving an apparatus through a tubular may be used as the support for the sensors 30N, 40N, with or without wheels, including, but not limited to, known head, mounts and/or carriages for welding equipment used within tubulars and for apparatuses for inspecting welds within tubulars.

The system 80 includes appropriate cables, circuitry, wiring signal processing, reception, and/or transmitting equipment, devices, and/or apparatuses as described for the other systems herein according to the present invention.

In other aspects and embodiments of the present invention, detectors or shoes and their associated structures and apparatus (as in any system described above) are deleted and a laser beam (or beam from other beam-employing linear distance measurement devices) is directed to and reflected from the surface of the tubular itself (in either systems for measuring and inspecting outer diameter of a tubular, inner diameter of a tubular, or both); or other liner distance measuring devices without shoes or detectors. In such systems without detectors or shoes, any desired number of beam apparatuses or other liner distance measuring devices may be used on a head, support, or other mount outside of and/or within a tubular.

The present invention, therefore, in at least some, but not necessarily all, embodiments provides a system for measuring outer diameter of a tubular, the system having a pair of sensors diametrically opposed to each other and between which a tubular to be measured is movable, each sensor of the pair of sensors including a detector for contacting an outer surface of the tubular, each said detector movably mounted to mount apparatus, each said detector movable along the outer surface of the tubular and axially movable in response to variation in outer diameter of the tubular, each detector including a beam reflective surface for reflecting a laser beam, a rotatable head rotatable around the tubular, the mount apparatus secured to the rotatable head, each detector movable with respect to the rotatable head, a pair of laser apparatuses secured to the mount apparatus, one each of the pair of laser apparatuses associated with each of the sensors of the pair of sensors, each laser apparatus for directing a laser beam to a corresponding detector's beam reflective surface for receiving a reflected laser beam and for producing a signal indicative of distance between said beam reflective surface and the laser apparatus, and transmitting apparatus for transmitting said signals to processing equipment for determining outer diameter of the tubular. Such a system may have one or some of the following, in any possible combination: processing equipment for determining outer diameter of the tubular; display apparatus for displaying outer diameter of the tubular, an image of the tubular in two or three dimensions and/or printer or strip chart apparatus for graphically and/or pictorially presenting data and/or images related to the tubular's crosssectional shape, diameter and/or ovality; linear motion encoding apparatus for sensing location of the rotatable head along the tubular; circumferential location indicating apparatus for sensing circumferential location of the pair of sensors around the tubular; linear motion encoding apparatus for sensing location of the rotatable head along the tubular, and correlating apparatus (e.g., a computer and/or other electronic processor) for correlating circumferential location of the pair of sensors and location of the rotatable head along the tubular to provide a location of an outer diameter measurement on the tubular; wherein the transmitting apparatus is on the rotatable head and the transmitting apparatus having wireless transmitting apparatus for transmitting signals indicative of tubular outer diameter; reception apparatus for receiving signals transmitted by said wireless transmitting apparatus or other non-wireless transmitting apparatus used with the system; processing equipment in communication with said reception apparatus for processing signals received by the reception apparatus to determine outer diameter of the tubular; display apparatus for displaying outer diameter of the tubular; wherein the display apparatus can display an image of the tubular in cross-section and/or a three dimensional image of the tubular; wherein the display apparatus can display a matrix of multiple outer diameter measurements of the tubular at different known locations on the tubular; wherein the processing equipment includes means for nullifying effects of tubular off-centering with respect to the pair of sensors; wherein the transmitting apparatus is apart from the rotatable head; processing equipment on the rotatable head for processing signals from the sensors and for transmitting signals indicative of tubular outer diameter to reception apparatus apart from the rotatable head; rotating apparatus for rotating the rotatable head; tubular movement apparatus for moving the tubular through the rotatable head between the pair of sensors; wherein the tubular is from the group consisting of pipe, drill pipe, riser, casing, drill collar, and tubing;

The present invention, therefore, in at least some, but not necessarily all, embodiments provides a system for measuring outer diameter of a tubular, the system having at least one sensor adjacent which a tubular to be measured is movable, the at least one sensor including a detector for contacting an outer surface of the tubular, said detector movably mounted to mount apparatus, said detector movable along the outer surface of the tubular and movable axially in response to variation in outer diameter of the tubular, said detector including a beam reflective surface for reflecting a laser beam, a rotatable head rotatable around the tubular, the mount apparatus secured to the rotatable head, at least one laser apparatus secured to the mount apparatus, said at least one laser apparatus associated with the at least one sensor, said at least one laser apparatus for directing a laser beam to the detector's beam reflective surface for receiving a reflected laser beam and for producing a signal indicative of distance between said beam reflective surface and the at least one laser apparatus, and transmitting apparatus for transmitting said signals to processing equipment for determining outer diameter of the tubular.

The present invention, therefore, in at least some, but not necessarily all, embodiments provides a system for measuring outer diameter of a tubular, the system having at least one linear distance measuring device adjacent which a tubular to be measured is movable, the at least one linear distance measuring device including a detector for contacting an outer surface of the tubular, the detector movably mounted to mount apparatus, the detector movable along the outer surface of the tubular and movable axially in response to variation in outer diameter of the tubular, a rotatable head rotatable around the tubular, the mount apparatus secured to the rotatable head, at least one signal production apparatus secured to the mount apparatus, and in communication with the linear distance measuring device, the at least one signal production apparatus for producing a signal indicative of distance between said detector and a known point, and transmitting apparatus for transmitting said signals to processing equipment for determining outer diameter of the tubular. Such a system may have one or some of the following, in any possible combination: wherein the linear distance measuring device is from the group consisting of laser devices, electronic measurement devices, acoustic measurement devices, infrared measurement devices, and linear variable differential transformer devices.

The present invention, therefore, in at least some, but not necessarily all, embodiments provides a system for measuring diameter of a tubular, the system having at least one linear distance measuring device adjacent which a tubular to be measured is movable, a rotatable head rotatable with respect to the tubular, the at least one linear distance measuring device mounted on the rotatable head, and the at least one linear distance measuring device for producing a measurement signal indicative of a measurement of diameter of the tubular. Such a system may have one or some of the following, in any possible combination: for each of the at least one linear distance measuring device, a signal processing apparatus for receiving the measurement signal, for processing the measurement signal to produce a transmission signal indicative of the measured diameter, and for transmitting said transmission signal to additional processing apparatus; transmitting apparatus on the rotatable head and the transmitting apparatus having wireless transmitting apparatus for transmitting signals indicative of tubular outer diameter; reception apparatus for receiving signals transmitted by said wireless transmitting apparatus; processing equipment in communication with said reception apparatus for processing signals received by the reception apparatus to determine outer diameter of the tubular; display apparatus for displaying outer diameter of the tubular; wherein the at least one linear distance measuring device is from the group consisting of laser devices, electronic measurement devices, acoustic measurement devices, infrared measurement devices, and linear variable differential transformer devices; wherein the at least one linear distance measuring device is a plurality of spaced-apart linear distance measuring devices; wherein the signal processing apparatus is on the rotatable head; wherein the rotatable head is positionable within a tubular and wherein the diameter is an inner diameter; and/or wherein the rotatable head is rotatable outside of and around the tubular and the diameter is an outer diameter.

The present invention, therefore, in at least some, but not necessarily all, embodiments provides a method for measuring diameter of a tubular, the method including positioning a tubular adjacent a system for measuring diameter of a tubular, the system like any system herein according to the present invention, sensing distance from part of the system to a surface of the tubular, and producing a measurement signal indicative of a measurement of diameter of the tubular. Such a system may have one or some of the following, in any possible combination: wherein the diameter is an inner diameter of the tubular; and/or wherein the diameter is an outer diameter of the tubular.

What is claimed is:

1. A system for measuring outer diameter of a tubular, the system comprising a pair of sensors diametrically opposed to each other and between which a tubular to be measured is movable, each sensor of the pair of sensors including a detector for contacting an outer surface of the tubular, each said detector movably mounted to mount apparatus, each said detector movable along and in contact with the outer surface of the tubular and axially movable in response to variation in outer diameter of the tubular, each detector including a beam reflective surface for reflecting a laser beam, a rotatable head rotatable around the tubular, the mount apparatus secured to the rotatable head, each detector movable with respect to the rotatable head, rotating apparatus connected to the rotatable head for rotating the rotatable head around the tubular as the tubular is moved through the rotatable head, a pair of laser apparatuses secured to the mount apparatus, one each of the pair of laser apparatuses associated with each of the sensors of the pair of sensors, each laser apparatus for directing a laser beam to a corresponding detector's beam reflective surface for receiving a reflected laser beam and for producing a signal indicative of distance between said beam reflective surface and the laser apparatus, transmitting apparatus for transmitting said signals to processing equipment for determining outer diameter of the tubular, and tubular movement apparatus for moving the tubular through the rotatable head between the pair of sensors.

2. The system of claim 1 further comprising processing equipment for determining outer diameter of the tubular.

3. The system of claim 2 wherein the processing equipment includes means for nullifying effects of tubular off-centering with respect to the pair of sensors.

4. The system of claim 1 further comprising display apparatus for displaying outer diameter of the tubular.

5. The system of claim 1 further comprising linear motion encoding apparatus for sensing location of the rotatable head along the tubular.

6. The system of claim 1 further comprising circumferential location indicating apparatus for sensing circumferential location of the pair of sensors around the tubular.

7. The system of claim 1 further comprising linear motion encoding apparatus for sensing location of the rotatable head along the tubular, and correlating apparatus for correlating circumferential location of the pair of sensors and location of the rotatable head along the tubular to provide a location of an outer diameter measurement on the tubular.

8. The system of claim 1 wherein the transmitting apparatus is on the rotatable head and the transmitting apparatus comprising wireless transmitting apparatus for transmitting signals indicative of tubular outer diameter.

9. The system of claim 8 further comprising
reception apparatus for receiving signals transmitted by said wireless transmitting apparatus.

10. The system of claim 9 further comprising
processing equipment in communication with said reception apparatus for processing signals received by the reception apparatus to determine outer diameter of the tubular.

11. The system of claim 10 further comprising
display apparatus for displaying outer diameter of the tubular.

12. The system of claim 11 wherein the display apparatus can display an image of the tubular in cross-section.

13. The system of claim 11 wherein the display apparatus can display a three dimensional image of the tubular.

14. The system of claim 11 wherein the display apparatus can display a matrix of multiple outer diameter measurements of the tubular at different known locations on the tubular.

15. The system of claim 1 wherein the transmitting apparatus is apart from the rotatable head.

16. The system of claim 1 further comprising
processing equipment on the rotatable head for processing signals from the sensors and for transmitting signals indicative of tubular outer diameter to reception apparatus apart from the rotatable head.

17. The system of claim 16 wherein the processing equipment is also for determining whether the tubular's outer shape is oval or not based on signals from the sensors, the processing equipment also for transmitting signals indicative of determined ovality of the tubular.

18. The system of claim 1 wherein the tubular is from the group consisting of pipe, drill pipe, casing, drill collar, and tubing.

19. A system for measuring outer diameter of a tubular, the system comprising
at least one sensor adjacent which a tubular to be measured is movable,
the at least one sensor including a detector for contacting an outer surface of the tubular, said detector movably mounted to mount apparatus, said detector movable along and in contact with the outer surface of the tubular and movable axially in response to variation in outer diameter of the tubular, said detector including a beam reflective surface for reflecting a laser beam,
a rotatable head rotatable around the tubular, the mount apparatus secured to the rotatable head,
rotating apparatus connected to the rotatable head for rotating the rotatable head around the tubular as the tubular is moved through the rotatable head,
at least one laser apparatus secured to the mount apparatus, said at least one laser apparatus associated with the at least one sensor, said at least one laser apparatus for directing a laser beam to the detector's beam reflective surface for receiving a reflected laser beam and for producing a signal indicative of distance between said beam reflective surface and the at least one laser apparatus,
transmitting apparatus for transmitting said signals to processing equipment for determining outer diameter of the tubular, and
tubular movement apparatus for moving the tubular through the rotatable head adjacent the at least one sensor.

20. A system for measuring outer diameter of a tubular, the system comprising
at least one linear distance measuring device adjacent which a tubular to be measured is movable,
said at least one linear distance measuring device including a detector for contacting an outer surface of the tubular, said detector movably mounted to mount apparatus, said detector movable along the outer surface of the tubular and movable axially in response to variation in outer diameter of the tubular,
a rotatable head rotatable around the tubular, the mount apparatus secured to the rotatable head,
rotating apparatus connected to the rotatable head for rotating the rotatable head around the tubular as the tubular is moved through the rotatable head,
at least one signal production apparatus secured to the mount apparatus, and in communication with the linear distance measuring device, the at least one signal production apparatus for producing a signal indicative of distance between said detector and a known point,
transmitting apparatus for transmitting said signals to processing equipment for determining outer diameter of the tubular, and
tubular movement apparatus for moving the tubular through the rotatable head.

21. The system of claim 20 wherein the linear distance measuring device is from the group consisting of laser devices, electronic measurement devices, acoustic measurement devices, infrared measurement devices, and linear variable differential transformer devices.

22. A system for measuring diameter of a tubular, the system comprising
at least one linear distance measuring device adjacent which a tubular to be measured is movable,
a rotatable head rotatable with respect to the tubular, the at least one linear distance measuring device mounted on the rotatable head,
rotating apparatus connected to the rotatable head for rotating the rotatable head around the tubular as the tubular is moved through the rotatable head,
the at least one linear distance measuring device for producing a measurement signal indicative of a measurement of diameter of the tubular, and
tubular movement apparatus for moving the tubular through the rotatable head.

23. The system of claim 22 further comprising
for each of the at least one linear distance measuring device, a signal processing apparatus for receiving the measurement signal, for processing the measurement signal to produce a transmission signal indicative of the measured diameter, and for transmitting said transmission signal to additional processing apparatus.

24. The system of claim 23 wherein the signal processing apparatus is on the rotatable head.

25. The system of claim 22 further comprising
transmitting apparatus on the rotatable head and the transmitting apparatus comprising
wireless transmitting apparatus for transmitting signals indicative of tubular outer diameter.

26. The system of claim 25 further comprising
reception apparatus for receiving signals transmitted by said wireless transmitting apparatus.

27. The system of claim 26 further comprising
processing equipment in communication with said reception apparatus for processing signals received by the reception apparatus to determine outer diameter of the tubular.

28. The system of claim 22 further comprising
display apparatus for displaying outer diameter of the tubular.

29. The system of claim 22 wherein the at least one linear distance measuring device is from the group consisting of laser devices, electronic measurement devices, acoustic measurement devices, infrared measurement devices, and linear variable differential transformer devices.

30. The system of claim 22 wherein the at least one linear distance measuring device is a plurality of spaced apart linear distance measuring devices.

31. The system of claim 22 wherein the rotatable head is positionable within a tubular and wherein the diameter is an inner diameter.

32. The system of claim 22 wherein the rotatable head is rotatable outside of and around the tubular and the diameter is an outer diameter.

33. The system of claim 32 wherein the diameter is an inner diameter of the tubular.

34. The system of claim 32 wherein the diameter is an outer diameter of the tubular.

35. A method for measuring diameter of a tubular, the method comprising
positioning a tubular adjacent a system for measuring diameter of a tubular, the system comprising at least one linear distance measuring device adjacent which a tubular to be measured is movable, a rotatable head rotatable with respect to the tubular, rotating apparatus connected to the rotatable head for rotating the rotatable head around the tubular as the tubular is moved through the rotatable head, the at least one linear distance measuring device mounted on the rotatable head, the at least one linear distance measuring device for producing a measurement signal indicative of a measurement of diameter of the tubular, and tubular movement apparatus for moving the tubular through the rotatable head,
sensing with the at least one linear distance measuring device distance from said device to a surface of said tubular, and
producing with said at least one linear distance measuring device a measurement signal indicative of a measurement of diameter of the tubular.

36. A method for measuring diameter of a tubular, the method comprising
positioning a tubular adjacent a system for measuring diameter of a tubular, the system comprising at least one sensor adjacent which a tubular to be measured is movable, the at least one sensor including a detector for contacting an outer surface of the tubular, said detector movably mounted to mount apparatus, said detector movable along the outer surface of the tubular and movable axially in response to variation in outer diameter of the tubular, said detector including a beam reflective surface for reflecting a laser beam, a rotatable head rotatable around the tubular, the mount apparatus secured to the rotatable head, rotating apparatus connected to the rotatable head for rotating the rotatable head around the tubular as the tubular is moved through the rotatable head, at least one laser apparatus secured to the mount apparatus, said at least one laser apparatus associated with the at least one sensor, said at least one laser apparatus for directing a laser beam to the detector's beam reflective surface for receiving a reflected laser beam and for producing a signal indicative of distance between said beam reflective surface and the at least one laser apparatus, and transmitting apparatus for transmitting said signals to processing equipment for determining outer diameter of the tubular, tubular movement apparatus for moving the tubular through the rotating head, and
rotating the rotatable head around the tubular,
moving the tubular through the rotatable head, and
measuring the outer diameter of the tubular with the system.

37. The method of claim 36 wherein the diameter is an inner diameter of the tubular.

38. The method of claim 36 wherein the diameter is an outer diameter of the tubular.

39. The method of claim 36 further comprising
measuring diameter of the tubular at a plurality of spaced-apart locations on the tubular.

40. The method of claim 36 wherein the processing equipment is also for determining whether the tubular's outer shape is oval or not based on signals from the sensors, the processing equipment also for transmitting signals indicative of determined ovality of the tubular, the method further comprising
determining ovality of the tubular.

* * * * *